United States Patent [15] 3,653,744
Comstock et al. [45] Apr. 4, 1972

[54] OPTICAL MODULATOR UTILIZING A SLOW WAVE CIRCUIT

[72] Inventors: Richard L. Comstock, San Jose; Kungta K. Chow, Sunnyvale; William B. Leonard, Menlo Park, all of Calif.

[73] Assignee: Lockheed Aircraft Corporation, Burbank, Calif.

[22] Filed: May 22, 1970

[21] Appl. No.: 39,806

[52] U.S. Cl. .........................................350/160 R, 350/150
[51] Int. Cl. ..........................................G02f 1/18, G02f 1/26
[58] Field of Search ....................350/160, 161, 150; 315/3.5

[56] References Cited

UNITED STATES PATENTS 3,361,926  1/1968  Farney .................................315/3.5
3,453,561  7/1969  Bonner et al. .........................350/160
3,432,224  3/1969  Myers et al. ..........................350/160

Primary Examiner—Ronald L. Wibert
Assistant Examiner—V. P. McGraw
Attorney—H. Donald Volk and George C. Sullivan

[57] ABSTRACT

A broadband microwave circuit is utilized to provide a microwave electric field to interact with an electro-optic crystal to attain wideband light modulation. The electro-optic crystal in the modulator device is positioned in the path of a laser beam. The microwave electric field changes the ellipticity of polarization of the laser beam passing through the electro-optic crystal. A polarization analyzer is used to convert the polarization modulation to intensity modulation.

4 Claims, 2 Drawing Figures

PATENTED APR 4 1972 3,653,744

RICHARD L. COMSTOCK
KUNGTA K. CHOW
WILLIAM B. LEONARD
INVENTOR.

BY George C. Sullivan
Agent

H. Donald Volk
Attorney

# 3,653,744

OPTICAL MODULATOR UTILIZING A SLOW WAVE CIRCUIT

BACKGROUND OF THE INVENTION

Optical communication systems using coherent light sources have many advantages over conventional microwave channels and have been receiving increasing attention. Such systems exhibit greater directivity and are capable of operating with a wider bandwidth. Coherent light sources known as optical masers (or lasers) have been developed, but the problems involved in transmitting information by means of a light beam remains significant. One such a problem is the lack of an efficient and wideband light modulator that embodies simplicity in construction and ease of operation.

A number of modulators have been proposed by the prior art; the more practical ones utilizing microwave devices are of the linear electro-optic type in which an electric field, which is produced by a microwave device, is impressed upon a birefringent crystal so that the refractive indices of the crystal are made to change linearly in accordance with the impressed electric field. This is referred to as the Pockel's effect. One example of the prior art devices is shown in U.S. Pat. No. 3,402,002. It shows a baseband modulator employing a birefringent crystal of special cut to achieve low voltage operation. One important limitation of this type of device is that the modulation circuit is of the lump-element type and is useful only from DC to about 100 MHz. A similar proposal shown in U.S. Pat. No. 3,290,619 employs a coaxial circuit for baseband operation and a singly resonant structure for high-frequency operation. However, the limitation is still the limited bandwidth in both the baseband mode (DC to about 100 MHz.) and the resonant mode (inherently narrow band) operation. Another scheme employs a parallel-plane transmission line, commonly known in the microwave art as a strip line, as the modulating circuit in which a plurality of long electro-optic crystals (many microwave wavelengths long) are used as the dielectric for the line. To obtain cummulative interaction, the propagation of the light wave and the microwave fields must be phase-matched over the total length of the crystals, which is difficult to achieve in actual practice. In addition, because of the long crystals used, it is difficult to keep the temperature constant and uniform over the length of the crystals so that complex temperature-compensation schemes must be used. These schemes require the accurate orientation of the modulating crystals and also requires rotators. See U.S. Pat. No. 3,304,428. In still another device, electro-optic crystals are placed at nodes and antinodes of a multimode cavity to obtain modulation. This type of device is complicated, has narrow bandwidth (typically 5 MHz. at a center frequency of 1,000 MHz.), requires phase-matching and would generate undesirable modes which will not only destroy the cavity Q but can also produce cancellation effect at various crystals. See U.S. Pat. No. 3,393,381. In still another device, circularly polarized laser light is made to interact with a circularly polarized microwave electric field to obtain single sideband frequency modulation. Again, great complexity, both in optical and microwave components, is a limitation.

SUMMARY OF THE INVENTION

To overcome the limitation discussed above and to greatly increase the bandwidth of the modulated signal, the present invention utilizes a broadband circuit having a region of high electric field wherein a short electro-optic crystal is placed. Such circuits are obtained when individually resonant elements are closely coupled together to broaden the overall circuit bandwidth to an octave or greater. These may take the form of coupled cavities, coupled resonant lines, etc., that contain regions of uniform RF electric field, denoted herein as capacitive gaps. In the prior art, these circuits were used only for microwave devices such as filters and traveling-wave tubes. We have discovered that these capacitive gaps containing the RF electric field, which can be made to be spatially uniform and to have an amplitude which is constant with frequency over the entire bandwidth of the circuit, are useful for interacting with an electro-optic crystal to attain efficient wideband light modulation. In our device, an electro-optic crystal is mounted in the capacitive gap nearest to the output where the electric field is believed to be most constant in the passband of the circuit. The use of such a device alleviates the narrow bandwidth limitations commonly associated with singly resonant cavities.

Because of the uniform electric-field concentration in these capacitive gaps, electro-optic interaction is efficient, thus only a short crystal is needed. This eliminates problems normally associated with long crystals such as phase-matching, temperature compensation, etc. In addition, the circuit dimensions can be made small so that a compact and lightweight modulator, which is desirable in modern applications, can be obtained.

BRIEF DESCRIPTION OF THE DRAWINGS

Other features and advantages in the present invention will become apparent on perusal of the specification taken into conjunction with the accompanying drawings wherein.

A brief discussion will be presented relating to the conventional birefringent crystal to aid in the understanding of the present invention.

A crystal is said to be birefringent if the light polarized along one crystal axis propagates at a different velocity than light polarized along another axis. Such birefringence can occur naturally, i.e., without a bias electric field, or it can be induced by a bias electric field. When a polarized light beam is passed through a birefringent crystal the phase relationship between the two perpendicular components into which the polarized light beam can be resolved are changed, thereby changing the character of the polarized light as it passes through the crystal. The application of a RF voltage or other means for establishing an electric field in the crystal causes changes in the birefringence, usually increasing this characteristic, which also increases the amount or degree of phase alteration between the two perpendicular components. Thus, in the presence of an RF electric field, the two perpendicular components of the polarized light beam travel through the crystal at different relative speeds than they otherwise would, and thus the phase relationship between these components is altered in a fashion governed by the RF electric field. Phase modulation is said to have occurred.

Figure 1:
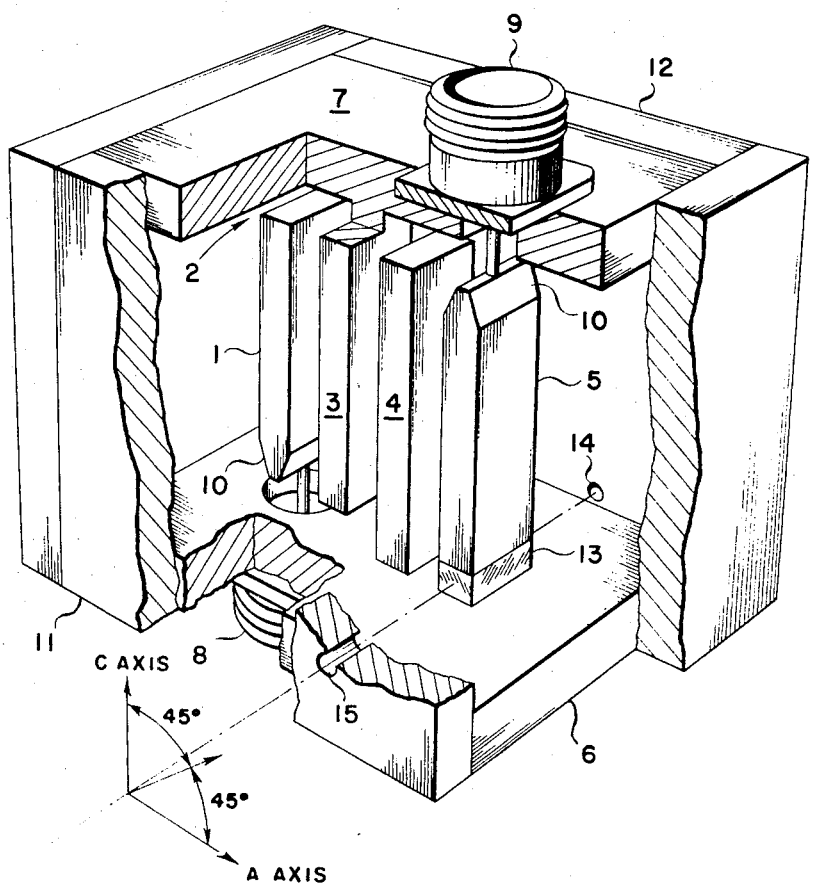
FIG. 1 is a pictorial illustration of a broadband circuit according to the invention used in conjunction with other apparatus to provide an optical modulator system.

Referring now to FIG. 1, there is shown one embodiment of the interdigital line broadband circuit of the present invention.

Resonant elements are formed by the interaction of the inductive digits 1, 3, 4 and 5 and their respective capacitive gap. For example, digit 1 functions as a center conductor of a strip line resonating with capacitive gap 2. Close coupling between the resonant elements is provided by the close proximity between digits 1, 3, 4 and 5. Digits 1 and 5 are separated from conductive end wall members 6 and 7 by coaxial connector 8 and 9 respectively. Connector 8 provides the means for connecting the interdigital-line circuit to a microwave power source (not shown), whereas connector 9 provide for the connection to a microwave termination (not shown). The simple taper portions 10 of the digits 1 and 5 serves as impedance transformers between the internal circuit impedance and those of the microwave source and termination. The conductive side walls 11 and 12 are the ground planes of the stripline, their inclusion completes the interdigital-line circuit. It is seen that such circuits possess great simplicity. The theory of wave energy propagation within an interdigital-line circuit for microwave devices such as traveling wave tubes and filters is well known. See U.S. Pat. No. 3,361,926 and G. L. Matthaei, L. Young and E. M. T. Jones, "Microwave Filters, Impedance Matching Networks and Coupling Sructures" McGraw-Hill 1964.

An electro-optic crystal cell 13, which may be a single domain lithium niobate crystal, for example, is positioned between, and in contact with, digit 5 and end wall 6. At this location the microwave voltage and therefore the electric field concentration is approximately constant over the passband of the interdigital-line circuit. A pair of apertures 14 and 15 in the conductive side-wall members 11 and 12 respectively allow the light to be modulated to pass through the crystal cell 13 and out of the modulator as the modulated light. It is clear from FIG. 1 that the use of such circuits for modulation results in a simple, compact and broadband modulator.

Figure 2:
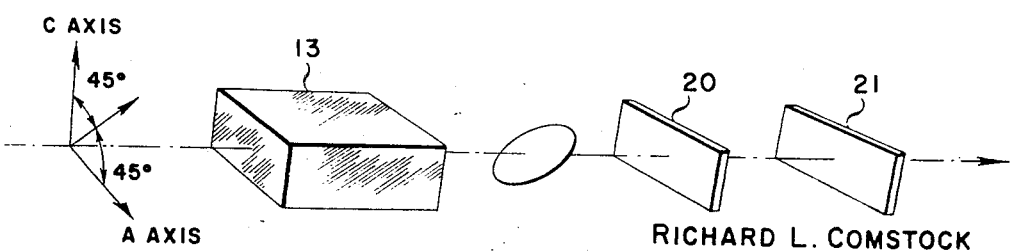
FIG. 2 shows one application of a modulator of the invention.

Referring now to FIG. 2, there is shown one embodiment of a modulation system incorporating the interdigital-line circuit modulator shown in FIG. 1. In this embodiment the electro-optic crystal is naturally birefringent and has its optic axis (commonly called the c-axis) parallel to the microwave electric field and the crystal a-axis perpendicular to the field. The incident light is linearly polarized at 45° to the crystal axis by any well known means (not shown). This linearly polarized light impinges on crystal cell 13 of the embodiment shown in FIG. 1, for example. Without the influence of the applied RF electric field, the polarization of the output light from the crystal cell 13 is elliptical. This will be referred to as the dc elliptical polarization state. Under the influence of the RF electric field applied to the crystal cell 13, the output light from crystal cell 13 produces an elliptical polarized light with the eccentricity of the ellipse being governed by the applied field. An optical compensator 20 is placed in the path of the emerging beam to change the DC elliptical polarization to circular polarization to facilitate the eventual conversion of phase modulation to intensity modulation. The polarization analyzer 21 is set at 90° with the input light polarization to effect this conversion. The intensity modulated beam can then be detected and used by any well known means (not shown).

As an example of the performance of this modulator, greater than 62 percent intensity modulation index, defined as the ratio of the peak value of the RF variation of light intensity to the average light intensity impinging upon the electro-optic crystal, has been obtained for 5,145 A. light over a frequency band of 1–2 GHz. at an RF modulation power of 5W. The electro-optic crystal used was a single domain lithium niobate crystal of dimensions 0.5 mm. × 0.5 mm. × 5 mm. Such compactness, simplicity, bandwidth and efficiency far exceeds those of the prior art.

The above discussions have been carried out in terms of an interdigital line circuit in the 1–2 GHz. band with a lithium niobate crystal. It is obvious to those familiar with the art of microwave circuitry that other structures, such as coupled-resonant cavities, which provide for a region of constant RF electric field concentration over a wide frequency range (e.g., an octave in the microwave frequencies), can be employed for the purpose of electro-optic modulation. It is also obvious to those familiar with the properties of electro-optic materials that the birefringent lithium niobate crystal does not represent the only choice, any substance which transmits light of the desired wavelength and whose optical propagation characteristics can be altered by an RF electric field may be used. Such alterable characteristics include, but are not limited to, change of refractive index or indices, absorption and reflection.

We claim

1. A broadband device for providing a microwave electric field to attain wideband light modulation of a beam of light, comprising, a first and second conductive end wall members, a first and second conductive side-wall members, a plurality of inductive digits, including at least a first and second digit, said plurality of digits positioned between said first and second end wall members, and between said first and second side-wall members, first connection means for connecting the broadband device to a microwave power source, second connection means for connecting the broadband device to a microwave termination, said first digit connected to said first connection means, said second digit connected to said second connection means, said first and second conductive end wall members, said first and second conductive side-wall members and said plurality of inductive digits together defining a region of uniform electric field concentration between said second digit and said first conductive end wall member, which region has a uniform electric field concentration over the bandwidth of said broadband device, a single crystal of electro-optic material positioned between said second digit and said first conductive end wall member in said region of uniform electric field concentration, a first aperture in said first side-wall member, a second aperture in said second side-wall member, said first aperture, said second aperture and said crystal of electro-optic material being optically aligned for transmission of said beam of light therethrough for wideband modulation.

2. The broadband device for modulating a beam of light according to claim 1 wherein said single crystal is in contact with and positioned between said second digit and said first conductive end wall member.

3. The broadband device for modulating a beam of light according to claim 2 wherein a portion of said first and second digits are tapered.

4. The broadband device for modulating a beam of light according to claim 2 including an optical compensator means and a polarization analyzer means.

* * * * *